United States Patent
Mensing

(10) Patent No.: US 12,011,935 B2
(45) Date of Patent: Jun. 18, 2024

(54) PRINTING APPARATUS, PRINTER SYSTEM AND METHOD FOR PRINTING ON AN OBJECT

(71) Applicant: Siemens Aktiengesellschaft, Munich (DE)

(72) Inventor: Matthias Mensing, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 243 days.

(21) Appl. No.: 17/611,666

(22) PCT Filed: Apr. 21, 2020

(86) PCT No.: PCT/EP2020/061038
§ 371 (c)(1),
(2) Date: Nov. 16, 2021

(87) PCT Pub. No.: WO2020/229098
PCT Pub. Date: Nov. 19, 2020

(65) Prior Publication Data
US 2022/0212487 A1 Jul. 7, 2022

(30) Foreign Application Priority Data
May 16, 2019 (DE) ...................... 10 2019 207 158.6

(51) Int. Cl.
*B41J 25/00* (2006.01)
(52) U.S. Cl.
CPC .................................. *B41J 25/006* (2013.01)
(58) Field of Classification Search
CPC ....................................................... B41J 25/006
See application file for complete search history.

(56) References Cited

U.S. PATENT DOCUMENTS

| 5,732,623 A | 3/1998 | Compera et al. |
| 2004/0265413 A1 | 12/2004 | Russell et al. |

(Continued)

FOREIGN PATENT DOCUMENTS

| CN | 101189129 A | 5/2008 |
| CN | 101239349 A | 8/2008 |

(Continued)

OTHER PUBLICATIONS

Li Zhijie et al: "An overview of integrated printing workflow based on JDF technology." Printing Quality and Standardization.02(2009):22-26. doi:CNKI:SUN:YSZL.0.2009-02-022. [English abstract].

*Primary Examiner* — Jason S Uhlenhake
(74) *Attorney, Agent, or Firm* — Laurence A. Greenberg; Werner H. Stemer; Ralph E. Locher

(57) ABSTRACT

A printing apparatus includes a transport device for moving an object to be printed-on through a printing region of the printing apparatus in a predefined transport direction. A first printing head is configured for depositing a viscous printing material, the first printing head being slidable along a first sliding axis, which is perpendicular to the transport direction, by a first printing-head moving apparatus. A second printing head is configured for depositing the viscous printing material, the second printing head being slidable along a second sliding axis, which is parallel to the first sliding axis and is offset in the transport direction, by a second printing-head moving apparatus. The first and second sliding axes can each be moved in the transport direction by a moving apparatus that is controllable by a control apparatus.

14 Claims, 2 Drawing Sheets

(56) References Cited

U.S. PATENT DOCUMENTS

| | | |
|---|---|---|
| 2006/0033771 A1 | 2/2006 | Lofthus |
| 2009/0091779 A1 | 4/2009 | Ishinaga et al. |
| 2010/0309240 A1 | 12/2010 | Tomida et al. |
| 2013/0129455 A1 | 5/2013 | De Vries |

FOREIGN PATENT DOCUMENTS

| | | | | |
|---|---|---|---|---|
| CN | 101663098 A | * | 3/2010 | ............. B41J 29/13 |
| CN | 101875535 A | | 11/2010 | |
| CN | 101905576 A | | 12/2010 | |
| CN | 102267289 A | | 12/2011 | |
| CN | 102826762 A | | 12/2012 | |
| CN | 103269958 A | | 8/2013 | |
| CN | 105882122 A | | 8/2016 | |
| CN | 108212674 A | | 6/2018 | |
| DE | 10129094 A1 | * | 2/2003 | ............ B41J 11/007 |
| DE | 10129094 A1 | | 2/2003 | |
| DE | 102016205681 A1 | | 10/2017 | |
| EP | 2014374 A1 | | 1/2009 | |
| EP | 2022570 A1 | | 2/2009 | |
| JP | H04200180 A | | 7/1992 | |
| JP | 2003053244 A | | 2/2003 | |
| JP | 2006346593 A | | 12/2006 | |
| JP | 2007289884 A | | 11/2007 | |
| JP | 2008093651 A | | 4/2008 | |
| JP | 2010069707 A | | 4/2010 | |
| JP | 2013248752 A | | 12/2013 | |
| JP | 5470036 B2 | | 4/2014 | |
| JP | 2014195805 A | | 10/2014 | |
| KR | 20170043000 A | | 4/2017 | |
| TW | 201609440 A | | 3/2016 | |
| WO | 2008132833 A1 | | 11/2008 | |
| WO | WO 2014140192 A2 | | 9/2014 | |

\* cited by examiner

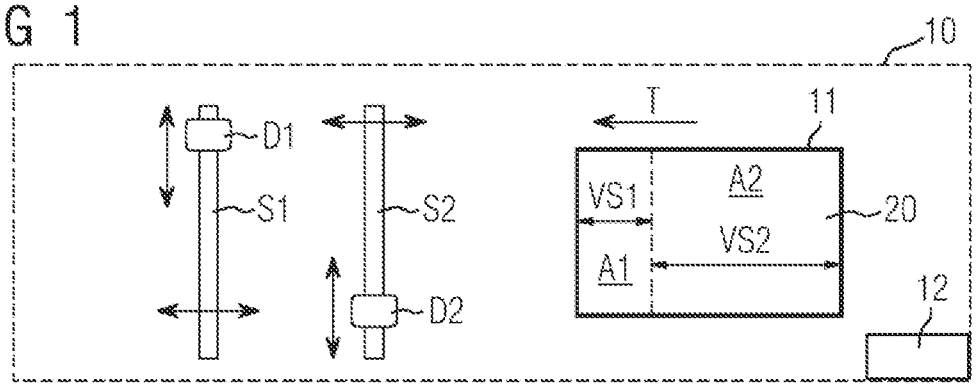
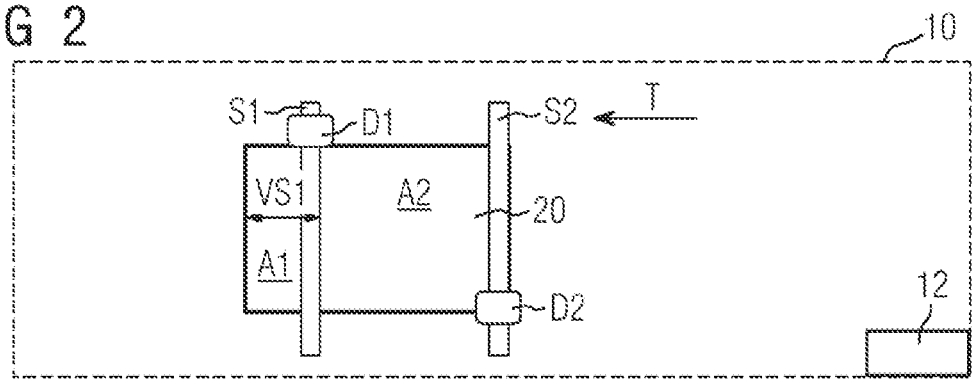
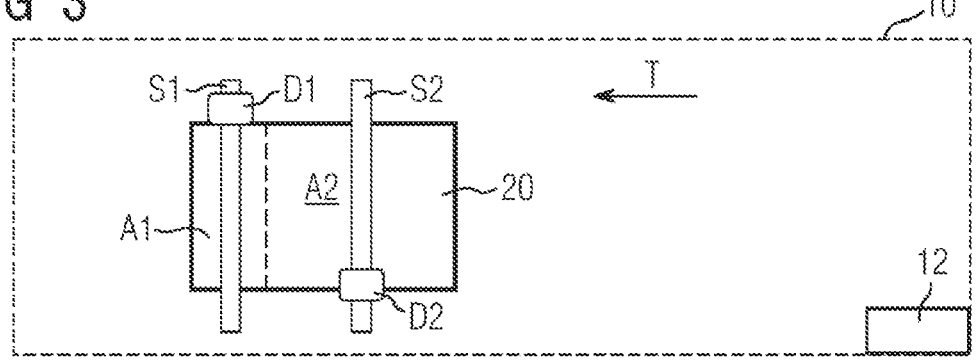
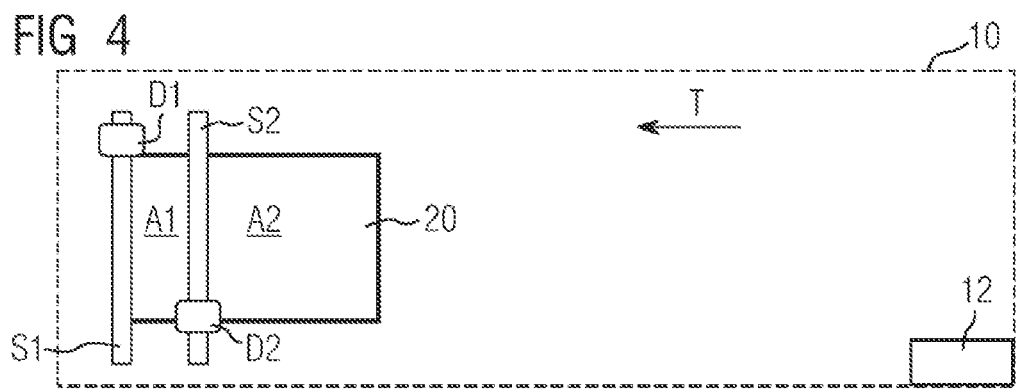

PRINTING APPARATUS, PRINTER SYSTEM AND METHOD FOR PRINTING ON AN OBJECT

FIELD AND BACKGROUND OF THE INVENTION

The invention relates to printing apparatuses, to a printer system and to a method for printing on objects.

The document WO 2014/140192 A2, see FIG. 11a there, discloses a printing apparatus with a transport apparatus which is suitable for moving an object to be printed on along a predefined transport direction through a printing portion of the printing apparatus. A first printing head serves for depositing a viscous printing material, wherein the first printing head is displaceable along a first sliding shaft, which lies transversely with respect to the transport direction, by means of a first printing head shifting apparatus. A second printing head likewise serves for depositing the viscous printing material, wherein the second printing head is displaceable along a second sliding shaft, which lies parallel to the first sliding shaft and is offset along the transport direction, by means of a second printing head shifting apparatus.

SUMMARY OF THE INVENTION

The invention is based on the object of even further improving a printing apparatus of the type specified at the beginning.

This object is achieved according to the invention by a printing apparatus with the features as claimed. Advantageous refinements of the printing apparatus according to the invention are specified in dependent claims.

Accordingly, it is provided according to the invention that the first and the second sliding shaft are each shiftable in the transport direction by means of a shifting apparatus which is activatable by a control apparatus.

A substantial advantage of the printing apparatus according to the invention can be seen in the fact that, in said printing apparatus, the first and second sliding shaft are in each case shiftable, and therefore, with suitable activation of the sliding shafts, minimum printing times can be achieved.

It is considered to be advantageous if the shifting apparatus is activated by the control apparatus in such a manner that the shifting apparatus between successive line printing phases shifts the first and the second sliding shaft in each case jointly relative to the object to be printed on, with a constant distance being maintained between the sliding shafts. This procedure is advantageous in particular whenever the surface to be printed on is to be printed on relatively uniformly.

It is considered to be even more advantageous if the shifting apparatus is activated by the control apparatus in such a manner that the shifting apparatus shifts each sliding shaft in each case individually relative to the object to be printed on, wherein each sliding shaft is in each case shifted to its next printing line as soon as the printing of the previous printing line is finished. This procedure can be advantageous in particular whenever the surface to be printed on is to be printed on relatively nonuniformly.

The control apparatus is preferably configured in such a manner that it for the printing of each printing line in each case activates the first and the second printing head shifting apparatus and displaces the first and second printing head along their respective sliding shaft and activates the printing heads in each case for dispensing viscous printing material at points of the respective printing line that are to be printed on, and activates the shifting apparatus in such a manner that the first and the second sliding shaft during their respective line printing are shifted in the transport direction at the same speed at which the transport device moves the object to be printed on in the transport direction.

In the case of the last-mentioned variant, it is advantageous if the control apparatus activates the shifting apparatus in such a manner that the sliding shafts are moved between successive line printing phases in each case more rapidly or slowly than the object to be printed on in the transport direction or counter to the transport direction such that they are in each case offset along the transport direction relative to the object to be printed on and, in the process, reach their next printing line position in each case.

The printing apparatus preferably has, in addition to the first and second printing head, a multiplicity of further printing heads which are each displaceable along a dedicated sliding shaft by means of a dedicated printing head shifting apparatus, wherein each of the sliding shafts in each case lies parallel to the first sliding shaft and is offset along the transport direction in relation to the first sliding shaft with an individual offset. The sliding shafts are preferably each movable individually along the transport direction by means of the shifting apparatus.

In the case of the last-mentioned variant, it is of advantage if the control apparatus activates the shifting apparatus in such a manner that the sliding shafts are each shifted during each line printing in the transport direction at the same speed at which the transport device moves the object to be printed on along the transport direction, and, between successive line printing phases, are each moved more rapidly or more slowly than the object to be printed on in the transport direction or counter to the transport direction.

Particularly short printing times can be achieved in an advantageous manner if the control apparatus is configured in such a manner that it assigns an individual number of printing lines, and therefore an individual shifting section relative to the object to be printed on, to each sliding shaft, specifically in such a manner that the printing effort per sliding shaft is distributed uniformly between the sliding shafts and all sliding shafts reach the end of their individual shifting section simultaneously or at least approximately simultaneously.

In the case of individual shifting sections, it is advantageous if the control apparatus after the object to be printed on is brought into the printing region before the beginning of the first line printing adjusts the distance of the sliding shafts along the transport direction in such a manner that the sliding shaft which, as seen along the transport direction, is located at the front with respect to the brought-in object is located offset with respect to the frontmost printing line to be printed on by the shifting section assigned to said sliding shaft and the sliding shaft which, as seen along the transport direction, is located at the rear with respect to the brought-in object, is located above the rearmost printing line to be printed on.

In the event that the object to be printed on is smaller, as seen along the transport direction, than the minimum possible distance of the sliding shafts, it is advantageous if the control apparatus adjusts the sliding shafts to precisely this minimum distance by means of the shifting apparatus and, although it moves sliding shafts located outside the object to be printed on along the transport direction, it leaves their printing heads inactive.

With regard to avoiding a collision, the control apparatus preferably activates the shifting apparatus in such a manner that the distance between adjacent sliding shafts is a predefined minimum distance which is at least the same size as the extent of the printing heads in the transport direction.

The printing apparatus preferably has a receiving apparatus for receiving and storing the object to be printed on. The object to be printed on is moved preferably jointly with the receiving apparatus through the printing region.

The sliding shafts preferably lie parallel to the plane in which the object to be printed on is transported along the transport direction.

Two or more printing heads can be arranged displaceably on or along one or more sliding shafts.

The printing material is preferably solder paste. The printing apparatus is therefore preferably a solder paste coating apparatus.

The invention also relates to a printer system comprising a printer platform and at least two printing apparatuses which are configured as claimed.

In order to be able to use such printing apparatuses particularly flexibly and to accelerate the printing operation overall, even when there is a plurality of objects to be printed on, it is provided that the printer platform has at least one input and output device which is configured to supply the printing apparatuses to the printer platform from the outside and to output the printing apparatuses from the printer platform to the outside; and in that the printing apparatuses are freely movable on the printer platform.

A particular advantage of the printer system according to the invention consists in that the individual printing apparatuses can be moved individually and flexibly as it were on the printer platform and, in the process, can be adapted to their printing process. For example, individual printing apparatuses can be moved on a parking position of the platform into a waiting position while other printing apparatuses pass more rapidly through the platform. Individual printing apparatuses can be overtaken in this case, for example in order to more rapidly process smaller printing tasks and to be able to output the printing apparatus again. A plurality of printing tasks can thus be processed in parallel as it were and in a manner adapted to the complexity of the respective printing task. Each printing apparatus here forms an individual item which, after loading of the printer platform, processes a respective printing task and is output again after the printing task is finished. The movement of the printing apparatuses can be controlled either centrally by a moving-path control apparatus of the printer platform or decentrally by moving-path control apparatuses of the respective printing apparatuses. In addition, the printing apparatuses can move on the printer platform by means of dedicated drive apparatuses, for example driven rollers or wheels, or they can be moved by movement apparatuses of the printer platform, for example conveyor belts, transport belts or transport rollers. Drives via linear motors, ultrasound and magnetic forces are also possible.

The invention furthermore relates to a method for printing on an object with a viscous printing material, wherein, in the method the object to be printed on is moved with a transport device along a predefined transport direction through a printing portion of the printing apparatus, a first printing head for depositing the viscous printing material is displaced along a first sliding shaft, which lies transversely with respect to the transport direction, by means of a first printing head shifting apparatus, and a second printing head for depositing the viscous printing material is displaced along a second sliding shaft, which lies parallel to the first sliding shaft and is offset along the transport direction, by means of a second printing head shifting apparatus.

According to the invention, it is provided with regard to such a method that the first and the second sliding shaft are shifted along the transport direction, in or counter to the transport direction, by means of a shifting apparatus.

With regard to the advantages and advantageous refinements of the method according to the invention, reference should be made to the above statements in conjunction with the printing apparatus according to the invention and the printer system according to the invention. In particular, the method also extends to the operation of freely movable printing apparatuses according to the invention on a printing platform of the printer system according to the invention.

The invention is explained in more detail below with reference to exemplary embodiments; by way of example:

BRIEF DESCRIPTION OF THE FIGURES

FIG. 1 shows an exemplary embodiment of a printing apparatus according to the invention before the beginning of a printing operation, FIG. 2 shows the printing apparatus according to FIG. 1 at the time of the beginning of the printing, FIG. 3 shows the printing apparatus according to FIGS. 1 and 2 during the printing operation, FIG. 4 shows the printing apparatus according to FIGS. 1 to 3 at the end of the printing operation.

DETAILED DESCRIPTION OF THE INVENTION

Figure 5:
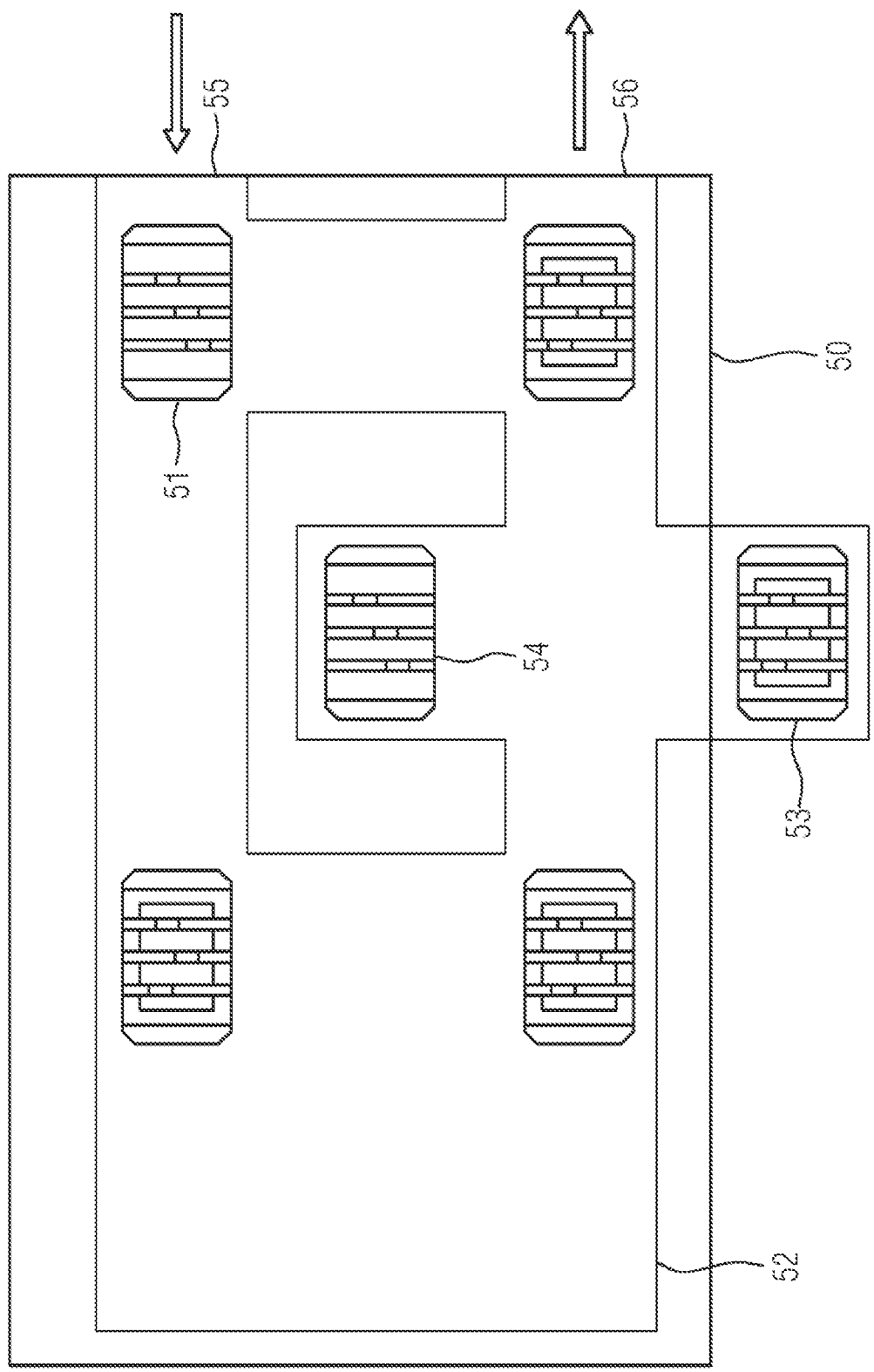
FIG. 5 shows a printer system with a printer platform and a plurality of printing apparatuses.

For the sake of clarity, the same reference signs are always used for identical or comparable components in the figures.

FIG. 1 shows a printing apparatus 10 which is suitable for printing on an object 20 to be printed on. The printing apparatus 10 can apply, for example, solder paste to a printed circuit board and can form a solder paste coating apparatus.

In order to print on the object 20, the latter is mounted on a receiving apparatus 11 of the printing apparatus 10, which receiving apparatus can be transported along a transport direction T into the active printing region of the printing apparatus 10 by means of a transport apparatus, not illustrated specifically. A control apparatus 12 of the printing apparatus 10 is used to control the transport apparatus, not shown specifically.

The printing apparatus 10 is furthermore equipped with a first printing head D1 and a second printing head D2. The first printing head D1 is mounted displaceably on a first sliding shaft S1 and can be displaced along said first sliding shaft S1. A first printing head shifting apparatus, not illustrated specifically, which is activated by the control apparatus 12 is used for displacing the first printing head D1 on the first sliding shaft S1.

The first sliding shaft S1 is arranged perpendicularly to the transport direction T and is located spatially above the plane in which the object 20 to be printed on or the receiving apparatus 11 lies. The object 20 to be printed on can therefore be displaced below the first sliding shaft S1 and below the first printing head D1.

The printing apparatus 10 furthermore has a second printing head D2 which is arranged displaceably on a second sliding shaft S2 and can be displaced along the second sliding shaft S2 by a second printing head shifting apparatus, likewise not illustrated specifically. The second printing head shifting apparatus is likewise activated by the control apparatus 12.

The second sliding shaft S2 is likewise arranged perpendicularly to the transport direction T and, like the first sliding shaft S1, is located spatially above the plane in which the object 20 to be printed on or the receiving apparatus 11 lies. The object 20 to be printed on can therefore also be displaced below the second sliding shaft S2 and below the second printing head D2.

The first sliding shaft S1 is arranged spatially in front of the second sliding shaft S2 along the transport direction T, and therefore the first sliding shaft S1 can also be referred to as sliding shaft located at the front and the second sliding shaft S2 as sliding shaft located at the rear.

The two sliding shafts S1 and S2 are each shiftable along the transport direction T; for this purpose, the printing apparatus 10 has, for the sliding shafts S1 and S2, a shifting apparatus, not shown specifically, which is actuated or activated by the control apparatus 12. Each of the two sliding shafts S1 and S2 is shiftable individually here by the shifting apparatus such that the distance between the two sliding shafts S1 and S2 during the printing operation can vary.

Before the beginning of a printing operation, the control apparatus 12 will first of all determine whether the printing effort is distributed equally or is not distributed equally over the surface to be printed on of the object 20 to be printed on. It is assumed below by way of example that the front region, in the transport direction T, of the object 20 to be printed on requires a greater printing effort than the region located at the rear and therefore the printing at the front takes longer than at the rear. For this reason, the surface to be printed on of the object 20 is divided into two partial surfaces A1 and A2, the printing effort of which is identical or at least approximately identical. Each of the partial surfaces A1 and A2 can in each case be assigned an individual shifting section VS1 or VS2 which is intended to be moved away from by the sliding shaft S1 or S2 assigned to the respective partial surface A1 or A2 and to be printed on by the respectively assigned printing head.

It is assumed below by way of example that the partial surface A1 is intended to be printed on by the printing head D1 located at the front, and therefore the front sliding shaft S1 has to move away from the shifting section VS1 during the printing operation. In a corresponding manner, the printing head D2 located at the rear will print on the partial surface A2, and therefore the sliding shaft S2 located at the rear will move away from the shifting section VS2.

FIG. 2 shows the printing apparatus 10 according to FIG. 1 at the time of the beginning of printing. It can be seen that the control apparatus 12 has shifted the object 20 to be printed on or the receiving apparatus 11 into the region of the two sliding shafts S1 and S2.

Furthermore, it can be seen from FIG. 2 that the sliding shaft S2 located at the rear has been shifted onto the rearmost printing line to be printed on of the partial surface A2 or of the shifting section VS2, as seen along the transport direction T. The sliding shaft S1 located at the front with the printing head D1 located at the front has been shifted onto the rearmost printing line to be printed on of the partial surface A1 or onto the beginning of the shifting section VS1, as seen along the transport direction T.

FIG. 3 shows the printing apparatus 10 during the printing operation. It can be seen that, owing to the different printing effort in the two partial surfaces A1 and A2, the sliding shafts S1 and S2 can be shifted in relation to the object 20 to be printed on with different rapidity along the transport direction T, and therefore the distance between the two sliding shafts S1 and S2 changes during the printing operation.

FIG. 4 shows the printing apparatus 10 at the time of finishing the printing operation. It can be seen that the sliding shaft S1 located at the front has moved away from the shifting section VS1 and has reached the end of the partial surface A1. In a corresponding manner, the sliding shaft S2 located at the rear has also finished printing on the partial surface A2 at this time or at least close in time thereto and has reached the end of its shifting section VS2.

In summary, the effect therefore achieved by the division of the surface to be printed on into partial surfaces A1 and A2 and by an individual determination and assignment of shifting sections VS1 and VS2 to the sliding shaft S1 located at the front and to the sliding shaft S2 located at the rear is that the two printing heads D1 and D2 or the two sliding shafts S1 and S2 have at least approximately completed the same amount of work and therefore reach the end of their individually assigned shifting section VS1 or VS2 simultaneously or at least approximately simultaneously at the end of the printing operation.

It is assumed by way of example in the exemplary embodiment according to FIGS. 1 to 4 that each sliding shaft S1 and S2 is in each case assigned an individual shifting section VS1 or VS2 or an individually sized partial surface A1 or A2 so that each of the printing heads has the same printing effort or at least a printing effort of similar magnitude during the printing operation. Alternatively, it is possible to dispense with this differentiation and to stipulate that the partial surfaces A1 and A2 are always identical in size irrespective of the printing effort. In this case, the sliding shafts S1 and S2 can be shifted with a constant distance from one another during the printing operation. If the printing effort differs in magnitude for the two partial surfaces, the length of time of the printing operation is determined by the printing effort for the partial surface to be printed on the most.

In the exemplary embodiment according to FIGS. 1 to 4, it is assumed by way of example that, during the printing of each printing line, the sliding shafts S1 and S2 are each moved at the same transport speed along the transport direction T as the object 20 to be printed on or the receiving apparatus 11, and therefore printing lines are printed on perpendicularly to the transport direction T.

Furthermore, in the exemplary embodiment according to FIGS. 1 to 4, it is assumed by way of example that, for reaching the next printing line in each case or for the relative shifting in relation to the object 20 to be printed on, the sliding shafts S1 and S2 are each moved more rapidly than the object 20, i.e. are displaced along the transport direction T in relation to the object 20 to be printed on. Alternatively, it is possible to provide a relative displacement of the sliding shafts S1 and S2 counter to the transport direction T by, for example, for changing printing lines, the sliding shafts S1 and S2 being moved more slowly along the transport direction T than the object 20 to be printed on.

In the exemplary embodiment according to FIGS. 1 to 4, also for reasons of clarity, the starting point by way of example is just two sliding shafts S1 and S2; alternatively, more than two sliding shafts can also be provided in order to increase the printing speed of the entire printing operation or of the printing operation as a whole.

In the exemplary embodiment according to FIGS. 1 to 4, also for reasons of clarity, the starting point by way of example is just one printing head per sliding shaft; alternatively, more printing heads can also be provided per sliding shaft in order to increase the printing speed of the entire printing operation or of the printing operation as a whole.

In the exemplary embodiment according to FIGS. 1 to 4, also for reasons of clarity, it is merely shown by way of example that the sliding shafts are moved parallel to the plane in which the object to be printed on is transported along the transport direction; it is also possible for the sliding shafts to additionally be moved or shifted perpendicular to said plane in order to optimize the printing operation.

FIG. 5 shows a printer system 50 for printing viscous printing materials (e.g. solder paste) on objects to be printed on (e.g. printed circuit boards), said printer system comprising a printer platform 52, an input device 55 for equipping the printer platform 52, an output device 56 for outputting printing apparatuses 51 and at least two printing apparatuses 51 which are freely movable on the printer platform. As explained with respect to FIGS. 1-4, a printing apparatus comprises interconnected components, such as printing head shifting apparatuses and a transport apparatus. Since the printer platform 52 can receive a plurality of printing apparatuses 51, parallel processing of objects to be printed on with printing images (printing tasks) of different complexity is permitted in combination in a desired, simultaneous sequence which also changes during the printing operation. First of all, the objects to be printed on are inserted into the respective printing apparatuses 51 and the latter are then introduced into the printer system via the input device 55. Inside the printer system 50, the printing apparatuses 51 move freely on the printer platform 52 and can be moved, for example, into a parking position 53 or an elevator 54 for transport to a further level.

During the movement on the printer platform 52, the printing apparatuses 51 execute their respective printing tasks, wherein their movement on the platform is adapted to the type and duration of the printing task. For example, one printing apparatus 51 can be moved on the parking position into a waiting position in order to allow the substrate to be applied to cool or dry. In the meantime, it can be overtaken by other printing apparatuses which have simpler or shorter printing tasks.

The individual printing apparatuses are shiftable passively or actively in any direction. This also includes circular movements. Passive shiftability is referred to if the force for the movement is applied from the outside, and active if the force emanates from the printing apparatus itself. Both are possible simultaneously, and therefore at least one printing apparatus uses the one method and at the same time at least one further printing apparatus uses the other method for the movement.

The printing apparatus moves freely on the printer platform and optionally also on internal and/or external guiding systems, carriageways, rail systems or lifting systems. A central or decentral moving-path control unit controls each printing apparatus individually and thus permits a parallel processing.

Printer platform and each printing apparatus can have systems for vibration damping that are activatable individually independently of one another by a control unit. This includes the activation on the basis of preset values and also values which are measured, calculated and modeled during the printing operation.

The simultaneous use of a plurality of printing apparatuses and the individual activatability thereof make it possible for rapid printing operations to finish the printing by overtaking operations or accelerated outward transfer in their individually required printing time and for them not to have to wait in a series for the slowest printing operation located in front of them.

The printer platform 52 receives all of the elements which are required for the printing process but which do not have to be or are not intended to be carried along in the printing apparatuses.

In a departure from the shape illustrated in FIG. 5, the printer platform 52 can also adopt different configurations and especially can have any desired shape. For example, the printer platform 52 can also have a circular shape on which the printing apparatuses move in the manner of a carousel.

In addition to the functions described above, the printing apparatuses in the printer system can also be configured for receiving and dispensing process materials and consumables, energy, residual amounts and empty containers and therefore take on supporting functions for the printer system.

Although the invention has been illustrated and described specifically in detail by preferred exemplary embodiments, the invention is not restricted by the examples disclosed and other variations can be derived therefrom by a person skilled in the art without departing from the scope of protection of the invention.

The invention claimed is:

1. A printing apparatus, comprising:
a transport device configured for moving an object to be printed-on along a predefined transport direction through a printing region of the printing apparatus;
a first printing head for depositing a viscous printing material, said first printing head being displaceable along a first sliding shaft extending transversely with respect to the transport direction, and a first printing head shifting apparatus for displacing said first printing head along said first sliding shaft;
a second printing head for depositing the viscous printing material, said second printing head being displaceable along a second sliding shaft, said second sliding shaft extending parallel to said first sliding shaft and offset from said first sliding shaft along the transport direction, and a second printing head shifting apparatus for displacing said second printing head along said second sliding shaft; and
a shifting apparatus for shifting said first and second sliding shafts in the transport direction under activation by a control apparatus; and
wherein said control apparatus is configured:
to activate said shifting apparatus to shift said first and second sliding shafts between successive line printing phases in each case jointly relative to the object to be printed-on, while a constant distance is maintained between said sliding shafts; or
to activate said shifting apparatus to shift each of said first and second sliding shafts individually relative to the object to be printed-on, wherein each of said sliding shafts is respectively shifted to a next printing line as soon as printing of a previous printing line is finished; and
wherein said control apparatus is configured:
for printing each printing line, to activate said first and second printing head shifting apparatus and displace said first and second printing heads along the respective said sliding shaft and to activate said first and second printing heads in each case for dispensing viscous printing material at points of the respective printing line that are to be printed on; and
to activate said shifting apparatus to shift said first and second sliding shafts, during respective line printing thereof, in the transport direction at the same speed at which said transport device moves the object to be printed-on in the transport direction.

2. The printing apparatus according to claim 1, wherein said control apparatus is configured to activate said shifting apparatus to move said sliding shafts between successive line printing phases in each case more rapidly or slowly than the object to be printed-on in the transport direction or counter to the transport direction to cause said sliding shafts to become offset along the transport direction relative to the object to be printed-on and, in the process, to thereby reach a next printing line position.

3. The printing apparatus according to claim 1, which comprises a multiplicity of further printing heads each displaceable along a respectively dedicated sliding shaft by a respectively dedicated printing head shifting apparatus, and wherein:
   each of said further sliding shafts lies parallel to said first sliding shaft and offset along the transport direction in relation to said first sliding shaft with an individual offset; and
   said sliding shafts are in each case shiftable individually along the transport direction by said shifting apparatus.

4. The printing apparatus according to claim 1, wherein said control apparatus is configured to assign an individual number of printing lines, and therefore an individual shifting section relative to the object to be printed-on, to each sliding shaft, to cause a printing effort per sliding shaft to be distributed uniformly between said sliding shafts and all sliding shafts to reach an end of an individual shifting section thereof substantially simultaneously.

5. The printing apparatus according to claim 1, wherein said control apparatus is configured, after the object to be printed-on is brought into the printing region before a beginning of a first line printing, to adjust a spacing distance of said sliding shafts along the transport direction such that said sliding shaft which, as seen along the transport direction, is located at the front with respect to the object is offset with respect to a frontmost printing line to be printed on by the shifting section assigned to the respective said sliding shaft and said sliding shaft which, as seen along the transport direction, is located at the rear with respect to the object, is located above a rearmost printing line to be printed on.

6. The printing apparatus according to claim 1, wherein said control apparatus is configured, when the object to be printed-on is smaller, as seen along the transport direction, than a minimum possible distance of said sliding shafts, to adjust said sliding shafts to precisely the minimum distance by way of said shifting apparatus and, while said sliding shafts that are located outside the object to be printed-on are moved along the transport direction during the line printing, to leaves the respective said printing heads inactive.

7. The printing apparatus according to claim 1, wherein said control apparatus is configured to activate said shifting apparatus to set the distance between adjacent sliding shafts to a predefined minimum distance which is at least an equal size as an extent of said printing heads in the transport direction.

8. The printing apparatus according to claim 1, further comprising a receiving apparatus for receiving and storing the object to be printed-on, and wherein the object to be printed-on is moved jointly with said receiving apparatus through the printing region.

9. The printing apparatus according to claim 1, wherein said sliding shafts are oriented parallel to a plane in which the object to be printed-on is transported along the transport direction.

10. The printing apparatus according to claim 1, wherein:
   two or more printing heads are disposed displaceably on one or more sliding shafts; and/or
   said printing material is solder paste and said printing apparatus is a solder paste coating apparatus.

11. A printing system, comprising:
   a printer platform;
   at least two printing apparatuses according to claim 1;
   said printer platform having at least one input device configured to supply said printing apparatuses to said printer platform from outside and at least one output device configured to output said printing apparatuses from said printer platform to the outside; and
   said at least two printing apparatuses being freely movable on said printer platform.

12. A printing apparatus, comprising:
   a transport device configured for moving an object to be printed-on along a predefined transport direction through a printing region of the printing apparatus;
   a first printing head for depositing a viscous printing material, said first printing head being displaceable along a first sliding shaft extending transversely with respect to the transport direction, and a first printing head shifting apparatus for displacing said first printing head along said first sliding shaft;
   a second printing head for depositing the viscous printing material, said second printing head being displaceable along a second sliding shaft, said second sliding shaft extending parallel to said first sliding shaft and offset from said first sliding shaft along the transport direction, and a second printing head shifting apparatus for displacing said second printing head along said second sliding shaft; and
   a shifting apparatus for shifting said first and second sliding shafts in the transport direction under activation by a control apparatus;
   a multiplicity of further printing heads each displaceable along a respectively dedicated sliding shaft by a respectively dedicated printing head shifting apparatus, and wherein:
   each of said further sliding shafts lies parallel to said first sliding shaft and offset along the transport direction in relation to said first sliding shaft with an individual offset; and
   said sliding shafts are in each case shiftable individually along the transport direction by said shifting apparatus; and
   wherein said control apparatus is configured to activate said shifting apparatus to shift each of said sliding shafts during each line printing in the transport direction at a speed that is equal to a speed at which said transport device moves the object to be printed-on along the transport direction, and, between successive line printing phases, to move each of said sliding shafts more rapidly or more slowly in the transport direction or counter to the transport direction than the object to be printed-on.

13. The printing apparatus according to claim 12, wherein:
   said control apparatus is configured to activate said shifting apparatus to shift said first and second sliding shafts between successive line printing phases in each case jointly relative to the object to be printed-on, while a constant distance is maintained between said sliding shafts; or
   said control apparatus is configured to activate said shifting apparatus to shift each of said first and second sliding shafts individually relative to the object to be printed-on, wherein each of said sliding shafts is respectively shifted to a next printing line as soon as printing of a previous printing line is finished.

14. The printing apparatus according to claim 12, wherein said control apparatus is configured:
for printing each printing line, to activate said first and second printing head shifting apparatus and displace said first and second printing heads along the respective said sliding shaft and to activate said first and second printing heads in each case for dispensing viscous printing material at points of the respective printing line that are to be printed on; and
to activate said shifting apparatus to shift said first and second sliding shafts, during respective line printing thereof, in the transport direction at the same speed at which said transport device moves the object to be printed-on in the transport direction.

* * * * *